United States Patent [19]
Kanda et al.

[11] Patent Number: 5,721,798
[45] Date of Patent: Feb. 24, 1998

[54] CONNECTION STRUCTURE FOR AN OPTICAL WAVEGUIDE DEVICE AND METHOD OF FABRICATING THE SAME

[75] Inventors: Torahiko Kanda; Masashige Mitsuhashi, both of Tokyo, Japan

[73] Assignee: NEC Corporation, Tokyo, Japan

[21] Appl. No.: 722,455

[22] Filed: Sep. 27, 1996

[30] Foreign Application Priority Data

Sep. 27, 1995 [JP] Japan .................. 7-249888

[51] Int. Cl.$^6$ .................................. G02B 6/38
[52] U.S. Cl. ..................... 385/58; 385/70; 385/71
[58] Field of Search ........................ 385/53, 54, 55, 385/58, 59, 60, 63, 65, 70, 71, 77

[56] References Cited

U.S. PATENT DOCUMENTS 5,214,730  5/1993  Nagasawa et al. .................. 385/71

FOREIGN PATENT DOCUMENTS

5-257040  10/1993  Japan .
5-264855  10/1993  Japan .

*Primary Examiner*—Phan T. H. Palmer
*Attorney, Agent, or Firm*—Sughrue, Mion, Zinn, Macpeak & Seas, PLLC

[57] ABSTRACT

A connection structure of the present invention allows an optical waveguide device having a base plate connected to a connecting member to be removably connected not only to an optical connector but also to another optical waveguide device having an identical configuration without resorting to optical axis adjustment. The connection is therefore easy and highly reproducible.

17 Claims, 8 Drawing Sheets

CONNECTION STRUCTURE FOR AN OPTICAL WAVEGUIDE DEVICE AND METHOD OF FABRICATING THE SAME

BACKGROUND OF THE INVENTION

The present invention relates to a structure for separably connecting optical waveguide devices with guide pins and a clamp spring without resorting to optical axis adjustment, and a method of fabricating optical waveguide device applicable to the same.

To connect an optical waveguide device including an waveguide base plate and an optical array connector, it is a common practice to position the input/output end of the waveguide of the waveguide device and the fiber end or the connector face to face. Then, the optical axis of the waveguide device and that of the connector are aligned with an optical signal passed through the connecting portion being monitored. Subsequently, the waveguide device and connector are adhered, welded or otherwise affixed to each other. This kind of procedure is inefficient and increases the cost of the waveguide device. Japanese Patent Laid-Open Publication Nos. 5-264855 and 5-257040, for example, teach connection structures for solving this problem.

However, even the structures taught in the above documents have a problem in that they cannot connect two optical waveguide devices to each other, although they can connect the base plate of a waveguide device and an optical array connector. Moreover, when the waveguide device and connector are repeatedly attached and detached from each other, dust produced by friction is apt to enter the interface between the device and the connector and cause the connection loss to vary.

SUMMARY OF THE INVENTION

It is therefore an object of the present invention to provide a connection structure allowing, with ease and high reproducibility, an optical waveguide device having a base plate connected to a connecting member to be removably connected not only to an optical connector but also to another optical waveguide device having an identical configuration, without resorting to optical axis adjustment.

In accordance with the present invention, in a structure for connecting a first and a second optical waveguide device by positioning a first end of the first waveguide device where an input/output end of a first waveguide is located and a second end of the second waveguide device where an input/output end of a second waveguide is located face to face, and retaining the first and second waveguide devices together by a removable clamp spring such that the first and second ends are pressed against each other, the first end is formed with at least two first holes while the second end is formed with at least two second holes aligning with the first end and the respective hole of the second end when the first and second ends face each other, whereby the input/output ends of the first and second waveguides are aligned with each other.

Also, in accordance with the present invention, an optical waveguide device has a connecting member formed with at least two holes in an end thereof. A base plate is affixed to the connecting member and has an input/output end of an optical waveguide at an end thereof flush with the end of the connecting member. Anchor portions are included in the connecting member for anchoring, when a clamp spring has one end thereof anchored to another optical waveguide device positioned relative to the waveguide device by guide pins removably inserted into the holes and pressed against the ends of the connecting member and the base plate at an end thereof, the other end of the clamp spring.

Further, in accordance with the present invention, a method of fabricating an optical waveguide device has the steps of forming holes in a connecting member, applying a filler to the walls of the holes, and inserting, while the filler is softened, master pins, each pin being slightly greater in diameter than the guide pins into the holes, followed by hardening the filler and removing the master pins from the holes.

BRIEF DESCRIPTION OF THE DRAWINGS

The above and other objects, features and advantages of the present invention will become apparent from the following detailed description taken with the accompanying drawings in which.

PIG. 5 is a perspective view showing a second embodiment of the present invention.

PIGS. 9A and 9B are sections showing a method of producing an optical waveguide device and representative of a sixth embodiment of the present invention

DESCRIPTION OF THE PREFERRED EMBODIMENTS

To better understand the present invention, a brief reference will be made to a conventional optical waveguide device and a connection structure therefor, shown in FIG. 1. It is to be noted that the words "optical waveguide" refer to a circuit or a channel for transmitting light and includes an optical fiber, thin film waveguide and so forth.

Figure 1:
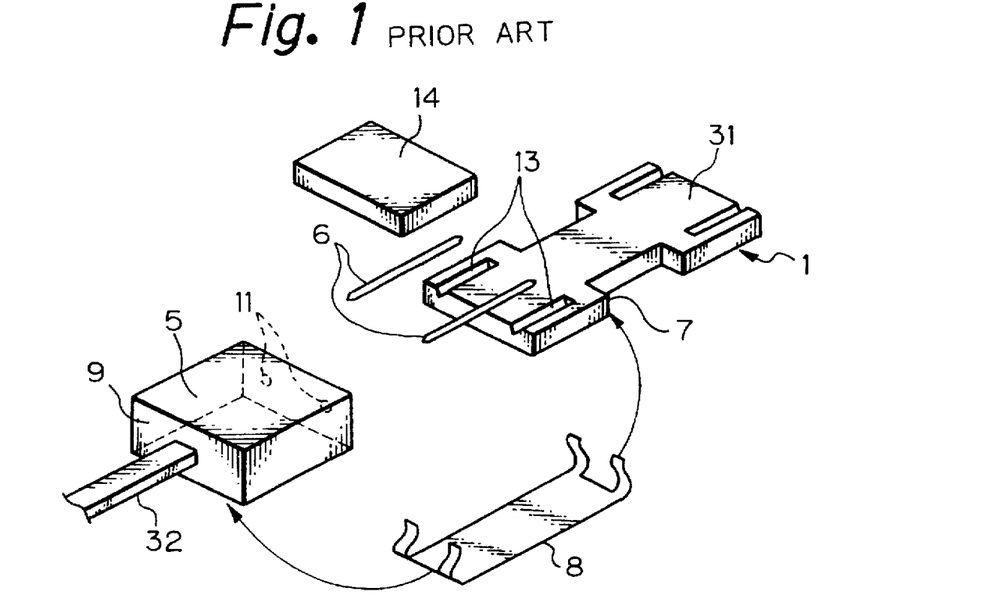
FIG. 1 is an exploded perspective view showing a conventional structure for connecting optical waveguide devices.

The connection structure shown in FIG. 1 is taught in previously mentioned Japanese Patent Laid-Open Publication No. 5-264855. As shown, a base plate 31 is formed with grooves 13 having a V-shaped cross-section by etching, machining or similar method. Guide pins 6 are respectively fitted in the grooves 13 and then affixed to the base plate 31.

An optical array connector 5 has holes 11 having the same diameter as the guide pins 6 and the same pitch as the grooves 13. After the guide pins 11 have been inserted into the connector 5 through the holes 11, a clamp spring 8 is fitted at one end on the rear end 9 of the connector 5 and at the other end in notches 7 formed in the base plate 31. As a result, the connector 5 and an optical waveguide device 1 are removably connected together without resorting to optical axis adjustment. The reference numeral 32 designates fiber optic cable connected to the rear end to 9 of the connector 5.

The guide pins 6 fitted in the grooves 13 are affixed to the base plate 31 by a presser plate 14 and adhesive. Alternatively, after the guide pins 6 have been fitted in the grooves 13, the presser plate 14 may be pressed in order press the pins 6 against the walls of the grooves 13, as taught in Japanese Patent Laid-Open Publication No. 5-257040.

The problem with the above conventional connection structure is that it cannot connect optical waveguide devices 1 to each other although it can connect the base plate 31 and optical array connector 5, as stated earlier. Moreover, when the waveguide device 1 and connector 5 are repeatedly attached and detached from each other, dust due to friction is apt to enter the interface between the device 1 and the connector 5 and cause the connection loss to vary.

Figure 2:
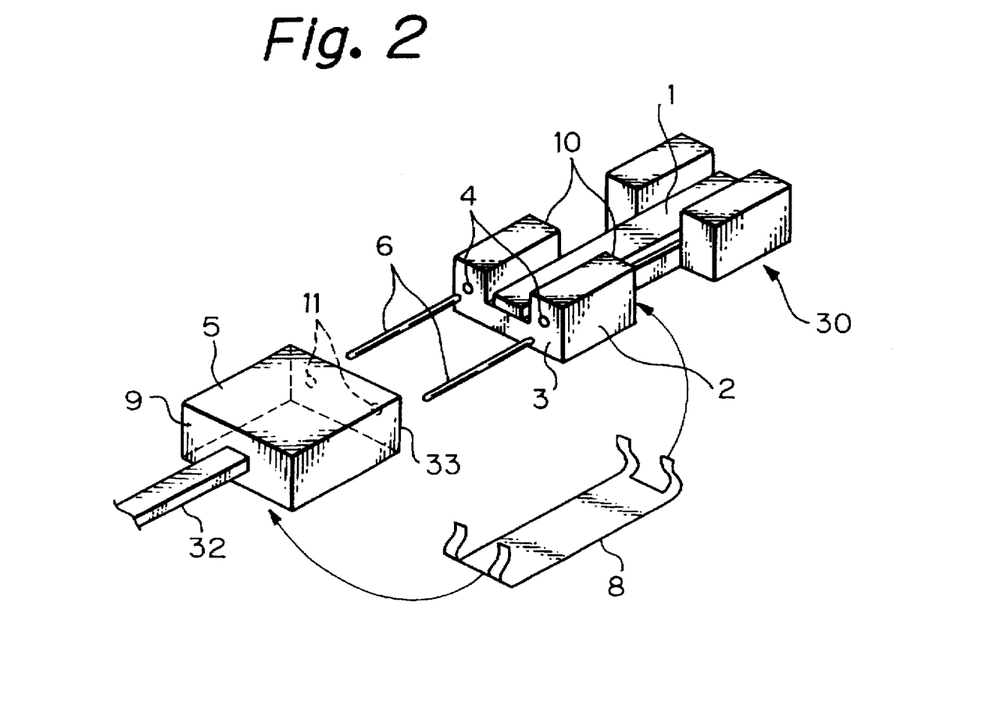
FIG. 2 is an exploded perspective view showing a first embodiment of the connection structure in accordance with the present invention.
Figure 3:
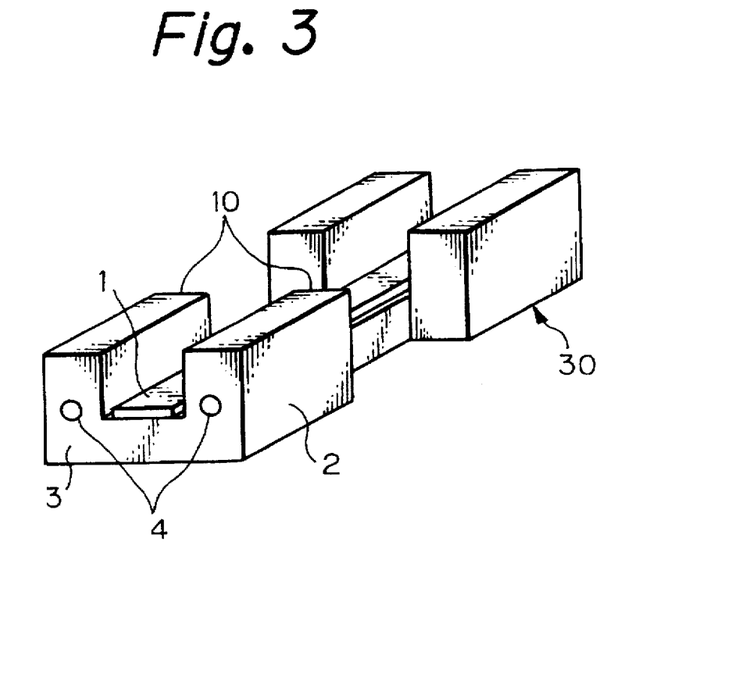
FIG. 3 is a perspective view showing an optical waveguide device included in the first embodiment.

Referring to FIG. 2, a first embodiment of the connection structure in accordance with the present invention is shown. An optical waveguide device included in the embodiment is shown in FIG. 3 in detail. The illustrative embodiment, like the conventional structure shown in FIG. 1, allows two optical waveguide devices to be aligned and connected together by guide pins. What is unique to the embodiment is that the guide pins are not permanently affixed to any one of the waveguide devices by adhesive, but removably fitted to both of the waveguide devices.

Specifically, as shown in FIG. 3, an optical waveguide device 30 has a base plate 1 adhered to a connecting member 2 formed with an optical waveguide. The base plate 1 is a flat strip which is about 1 mm thick. Each end of the connecting member 2 is flush with the adjoining end of the base plate 1 and forms an end 3 of the device 30 together with the end of the base plate 1. Two pairs of projections 10 extend from opposite sides of the connecting member 2, and each is contiguous with the adjoining end 3 of the member 2. A pair of holes 4 are formed in the projections 10 at each end of the connecting member 2 so as to receive a pair of guide pins 6, as shown in FIG. 2. The holes 4 are located at a preselected level with respect to the inlet/outlet end of the waveguide adjoining the upper surface of the end of the base plate 1.

A reference will be made to FIG. 2 for describing how the waveguide device 30 is connected to an optical array connector 5 which is another optical waveguide device. As shown, a tape-like multicore fiber optic cable 32 is connected to the rear end 9 of the optical array connector 5. The end of the fiber core line is affixed to the front end 33 of the connector 5. A pair of holes 11 having the same diameter as the holes 4 are formed in the front end 33 of the connector 5. The end of the fiber core line and the holes 11 are positioned relative to each other in the same manner as the end of the waveguide of the base plate 1 and the guide pins 4.

To connect the waveguide device 30 and connector 5, the guide pins 6 are inserted into the holes 4 and 11, and the end 3 of the device 30 and the front end 33 of the connector 5 are brought into contact. Then, a clamp spring 8 is fitted at one end on the rear end 9 of the connector 5 and at the other end on the ends of the projections 10 remote from the connector 5, resiliently retaining the connector 5 and projections 10. As a result, the connector 5 and device 30 are connected to each other. The connector 5 and device 30 can be easily separated from each other because the guide pins 6 are removable from the holes 4 and 11 and because the clamp spring 8 is removable from the connector 5 and projections 10.

Figure 4:
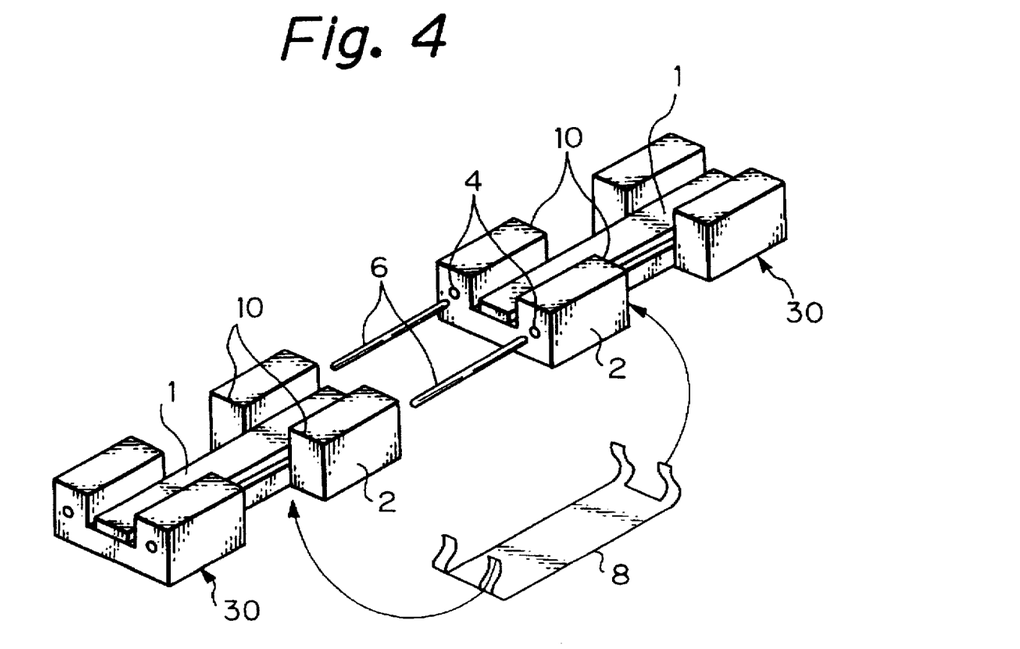
FIG. 4 is an exploded perspective view showing a structure for connecting two optical waveguide devices each having the configuration shown in FIG. 3.

FIG. 4 shows two optical waveguide devices 30 to be connected together. As shown, the guide pins 6 are inserted into the holes 4 of the two devices 30 so as to cause the ends 3 of the devices 30 to face each other. Subsequently, the clamp spring 8 is fitted at opposite ends thereof the ends of the projections 10 remote from each other. Again, the devices 30 are separable from each other because the guide pins 6 are removable from the holes 4.

Figure 5:
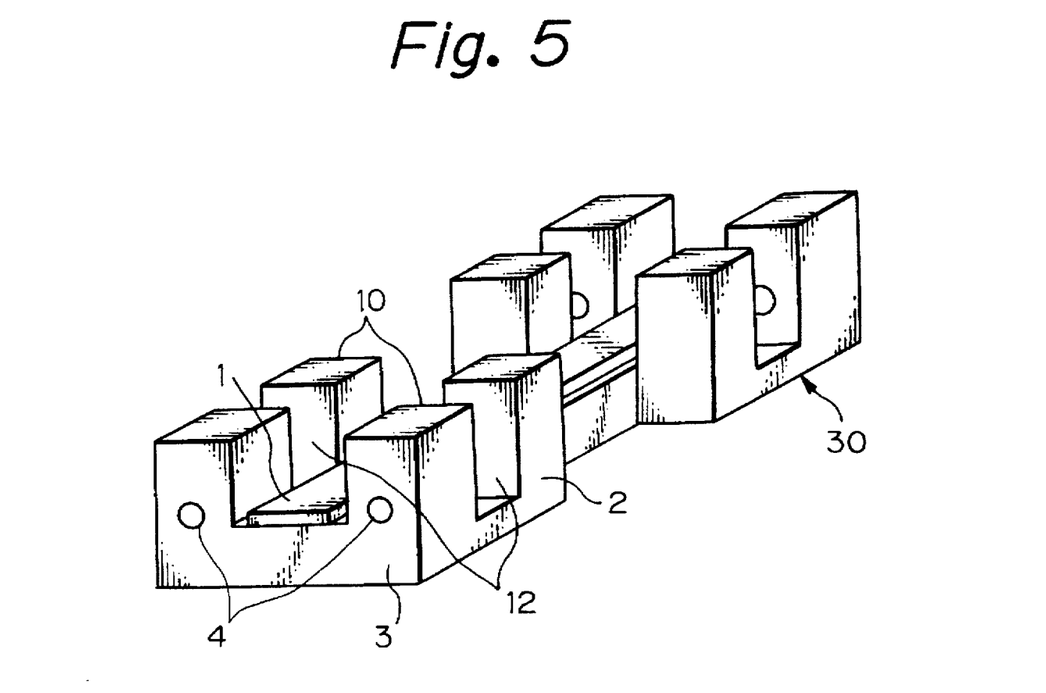

FIG. 5 shows a second embodiment of the present invention. As shown, each projection 10 is formed with a recess 12 at its intermediate portion. The guide pins 4 each extend throughout the respective projection 10 from the end 3 to the recess 12. With this configuration, it is possible to feed a grinding liquid, which will be described, and discharge waste efficiently. Further, a small amount of dust produced every time the guide pins 6 are inserted into and removed from the holes 4 due to friction is fully driven out of the holes 4, so that reliable connection is enhanced. The device 30 shown in FIG. 5 can be connected to the optical array connector 5 or another device 30 in the same manner as in FIG. 2 or FIG. 4.

Figure 6:
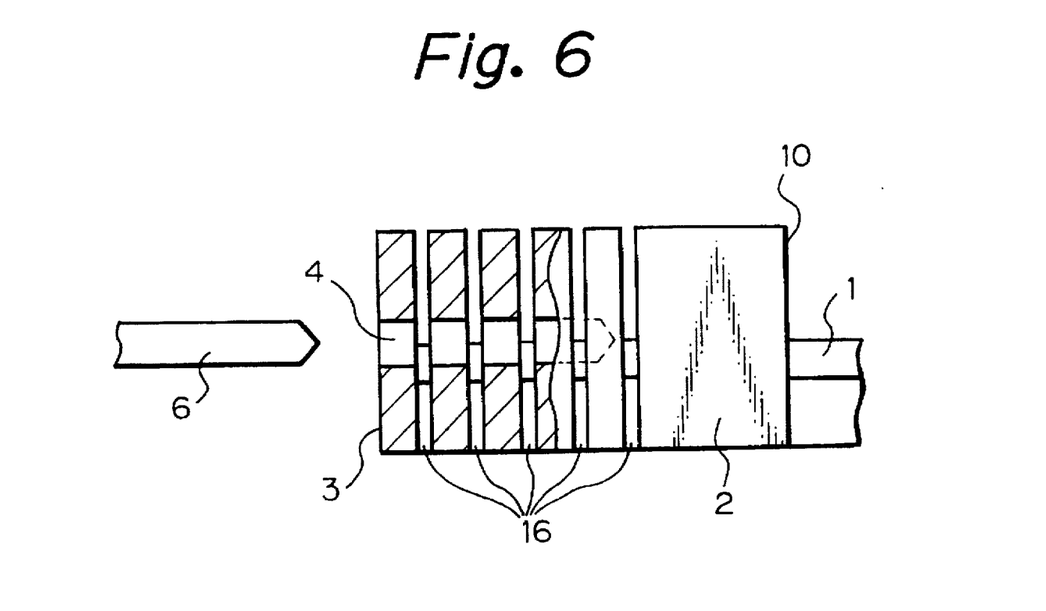
FIG. 6 is a side elevation showing a third embodiment of the present invention

FIG. 6 shows a essential part of a third embodiment of the present invention. As shown, each projection 10 of the connecting member 2 is formed with a plurality of slits 16. Each hole 4 extends throughout the slits 16 of the respective projection 10, i.e., it is implemented as a plurality of through holes aligned with each other. This kind of configuration also successfully achieves the advantages stated above in relation the second embodiment.

Figure 7A:
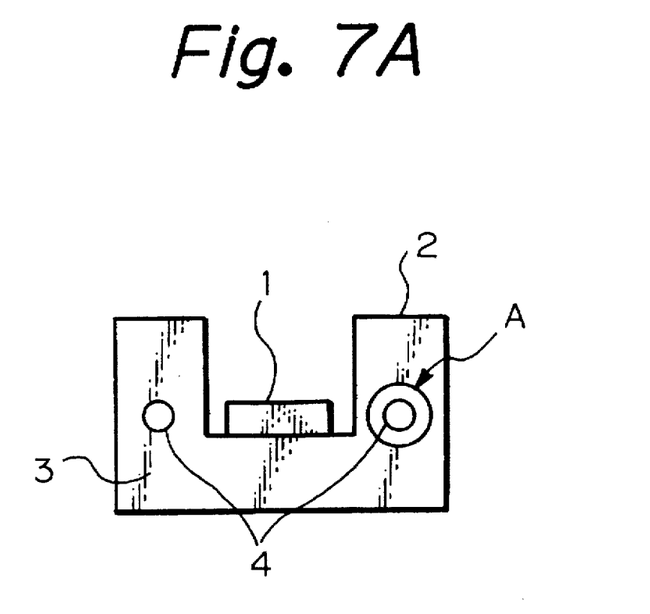
FIG. 7A is a front view showing a fourth embodiment of the present invention.
Figure 7B:
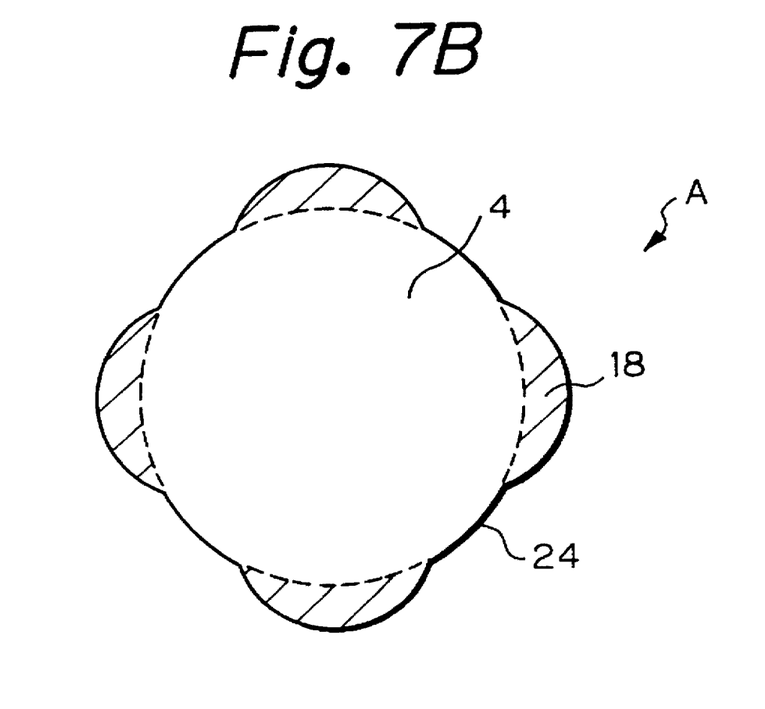
FIG. 7B is a fragmentary enlarged view showing a portion labeled A in FIG. 7A.

FIGS. 7A and 7B show a fourth embodiment of the present invention. As shown, each hole 4 has a cross-section in the form of a combination of a plurality of arcs. The hole 4 has an inside diameter portion 24 substantially identical in diameter with the guide pin 6, as indicated by a bold line in FIG. 7B. When the guide pin 6 is inserted into the hole 4, it is restricted by the inside diameter portion 24. Crescent pocket portions 18 bulge away from the inside diameter portion 24, as indicated by hatching in FIG. 7B. Dust produced every time the guide pin 6 is inserted into the hole 4 is successfully collected by the pocket portions 18, so that the connection is reliable. In addition, during finishing of the inside diameter portion 24, the pocket portions 18 promote the feed of the grinding liquid and the discharge of the waste and thereby insure the efficient formation of the hole 4.

Figure 8A:
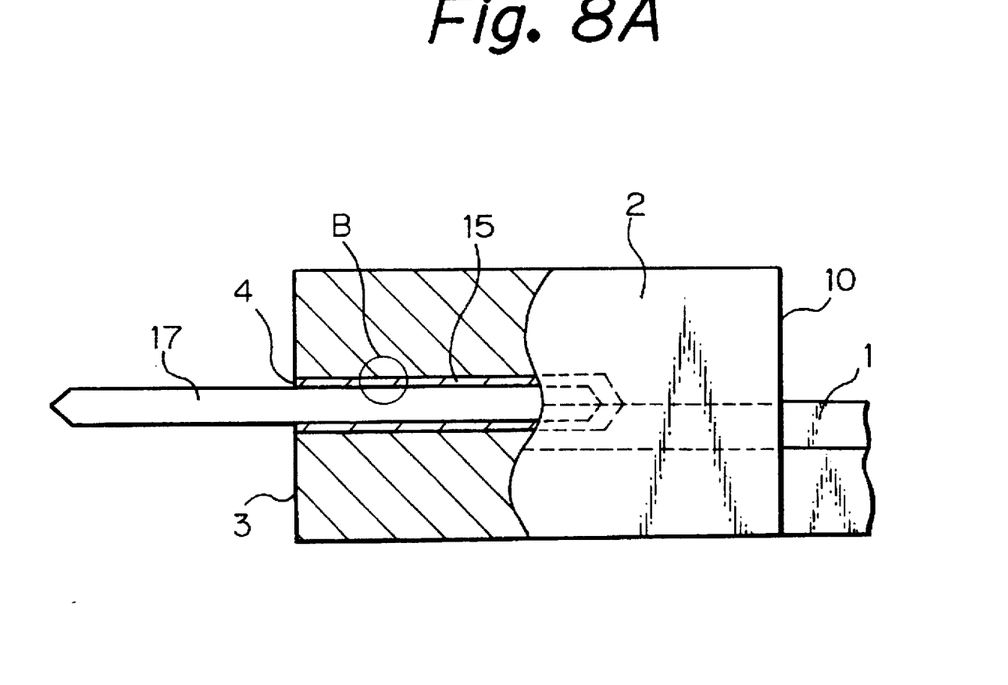
FIG. 8A is a fragmentary section showing a method of producing an optical waveguide device and representative of a fifth embodiment of the present invention.
Figure 8B:
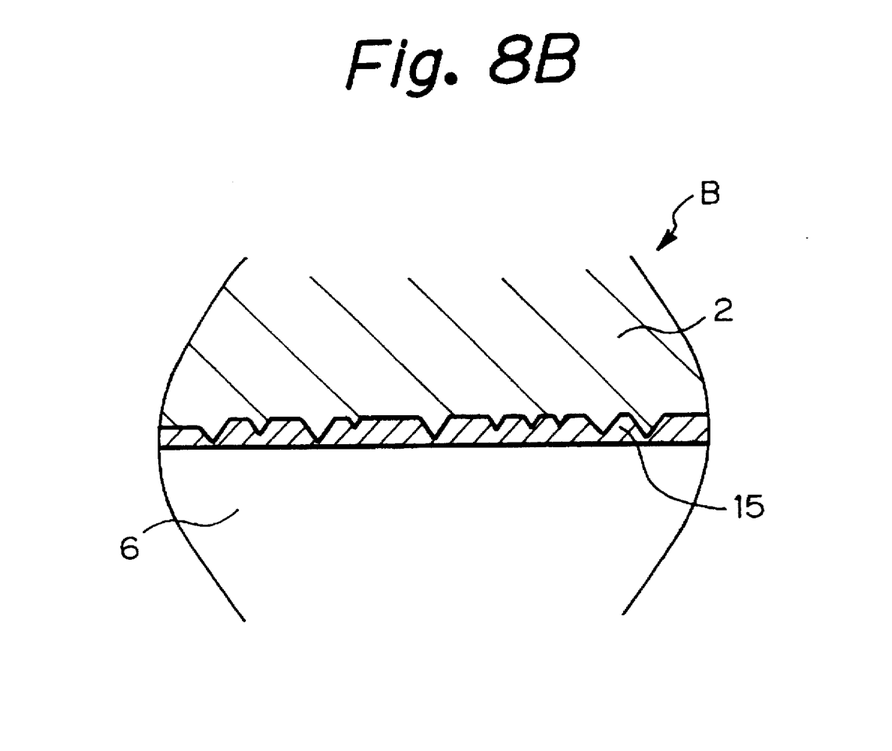
FIG. 8B is a fragmentary enlarged section showing a portion labeled B in FIG. 8A.

FIGS. 8A and 8B show a method of producing the waveguide device 30 and representative of a fifth embodiment of the present invention. As shown, after each hole 4 bas been formed in the connecting member 2, a filler 15 is applied to the wall of the hole 4. The filler 15 may be, e.g., thermoplastic wax or thermosetting resin. Subsequently, a master pin 17 is inserted into the hole 4. When the filler 5 is implemented as thermoplastic wax, the connecting member 2 is heated beforehand and then cooled, after the insertion of the master pin 17, to cause the filler 15 to harden. When use is made of thermosetting resin, the master pin 17 is inserted into the hole 4, then the connecting member 2 is heated to cause the filler 15 to set, and then the master pin 17 is removed. When the filler 15 hardens, the cylindrical contour of the master pin 17 is transferred to the wall of the hole 4 with the result that fine irregularities on the wall of the hole 4 are filled with the filler 15. This smooths the wall of the hole 4 and thereby allows a minimum of dust to appear when the guide pin 6 is inserted into the hole 4. Moreover, because the area over which the guide pin 6 and the wall of the hole 4 contact increases, the dislocation of the connecting portion between waveguide devices and the variation of connection loss ascribable thereto are obviated. It is to be noted that the diameter of the master pin 17 is selected to be slightly greater than the diameter of the guide pin 6 in order to allow the pin 6 to be inserted into and removed from the hole 4 without any clearance.

Figure 9A:
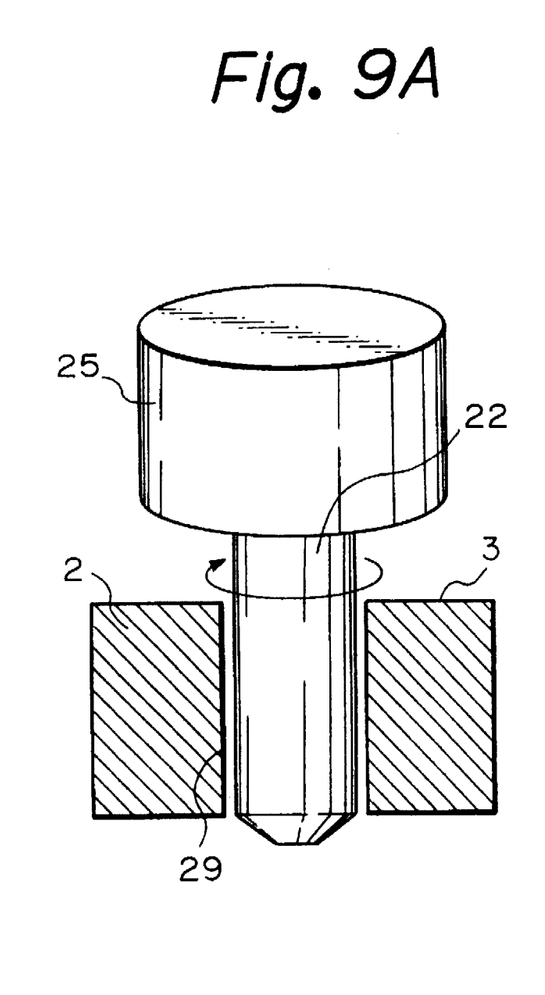
Figure 9B:
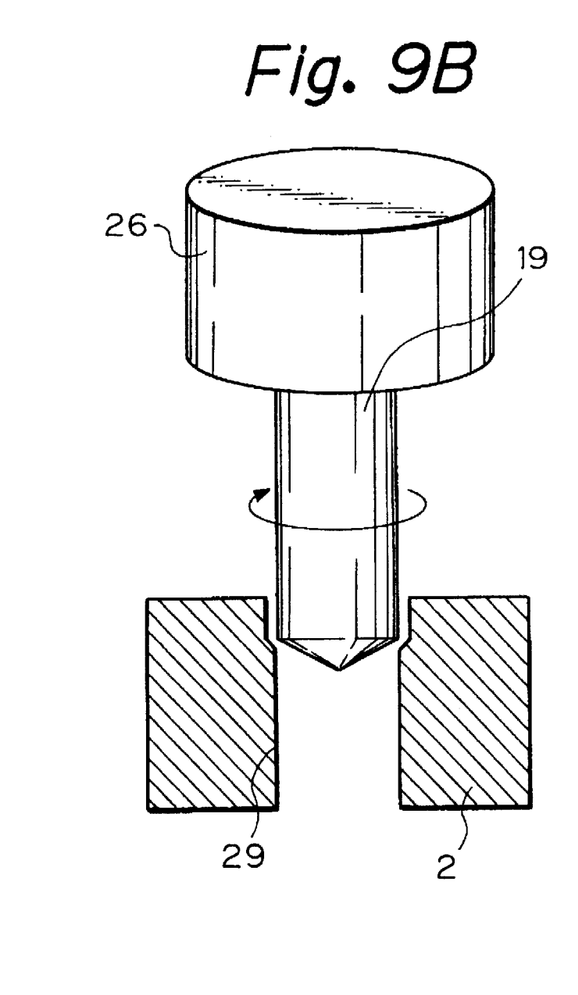

FIGS. 9A and 9B show a method of forming the hole 4 of the waveguide device 30 and representative of a sixth embodiment of the present invention. First, as shown in FIG. 9A, a spindle motor 25 using a ultrasonic wave causes a grindstone 22 with rough abrasive grain to rotate. The grindstone 22 forms a hole 29 in the end 3 of the connecting member 2. The rough abrasive grain provided on the grindstone 22 minimizes resistance ascribable to, e.g., stuffing and the fall of grinding accuracy ascribable to the resistance. Subsequently, as shown in FIG. 9B, an air spindle motor 26 causes a grindstone 19 with fine abrasive grain to rotate. The grindstone 19 finishes the wail of the hole 29 and thereby completes the hole 4. Because the hole 29 has been roughly formed in the connecting member 2, the member 2 is ground only in a small amount by the grindstone 19. This reduces the wear of the grindstone 19. Experiments showed that the grindstone 22 can form the hole 29 with a dimensional error of less than 1 μm and a positional error of less than 1 μm.

Figure 10:
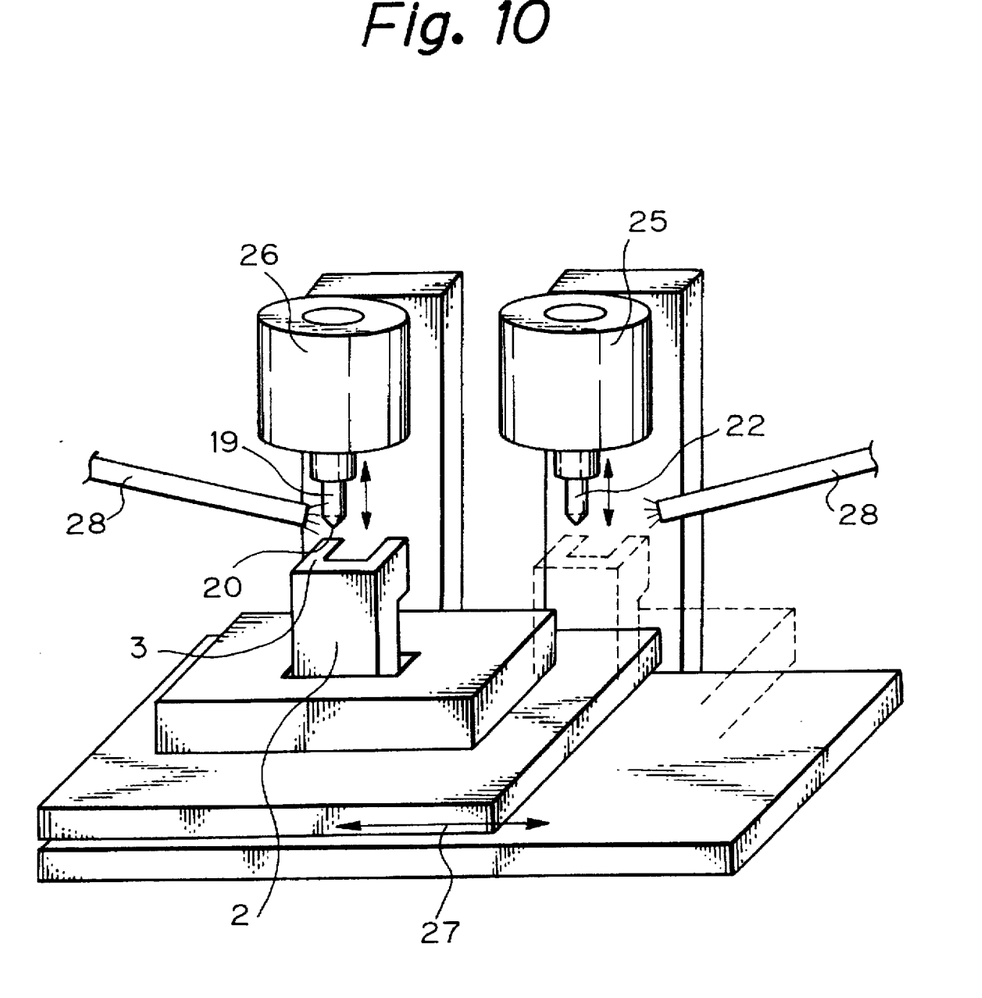
FIG. 10 is a perspective view showing a specific apparatus applicable to the method shown in FIG. 9 and FIGS. 11A–11C are sections showing a method of producing an optical waveguide device and representative of a seventh embodiment of the present invention.

FIG. 10 shows a specific apparatus applicable to the above sixth embodiment and a seventh embodiment to be described later. As shown, the air spindle motor 26 with the fine abrasive grain and the ultrasonic wave spindle motor 25 with the rough abrasive grain arc arranged in parallel to each other. The connecting member 2 is fixed in place on a stage 27 with its end 3 facing upward. The stage 27 is movable to locate the positions of the member 2 for forming the holes 4 just below the grindstone 22 and then just below the grindstone 19. The spindle motors 19 and 20 are each movable in the up-and-down direction. A grinding liquid 28 is fed to positions where the grindstones 19 and 20 work the member 2.

Figure 11A:
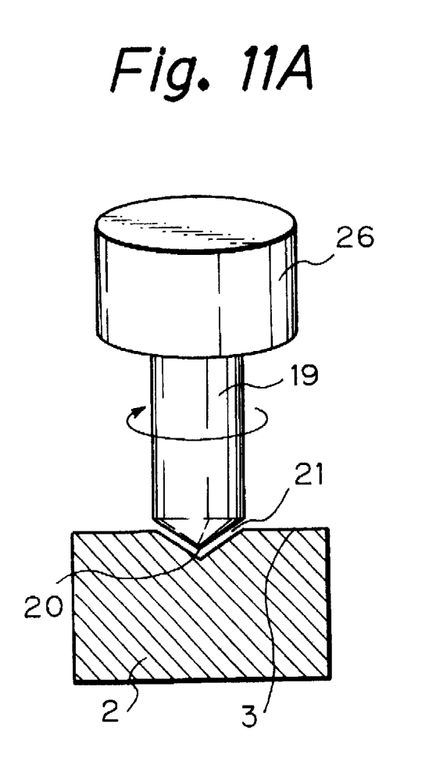
Figure 11B:
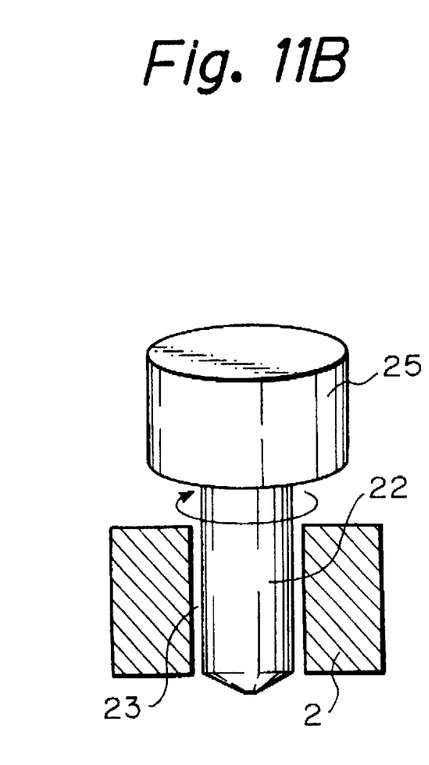
Figure 11C:
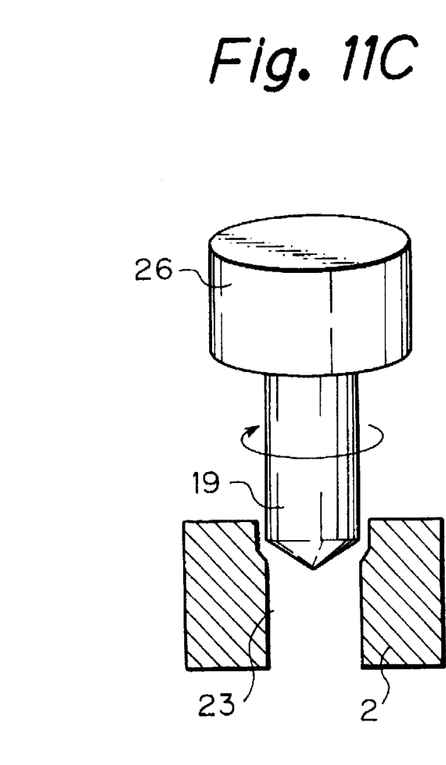

FIGS. 11A–11C show a method of producing the waveguide device and representative of a seventh embodiment of the present invention. First, as shown in FIG. 11A, the air spindle motor 26 causes the grindstone 19 with the fine abrasive grain to form a shallow tapered recess 21 in the end 3 of the connecting member 2 with its tip 20. The shallow recess 21 can be accurately positioned because the amount of grinding and therefore the resistance is small. Then, as shown in FIG. 11B, the ultrasonic wave spindle motor 25 causes the grindstone 22 with the rough abrasive grain to deepen the shallow recess 22 until a deep hole 23 has been formed. At this instant, the shallow recess 22 prevents the grindstone 22 from oscillating or otherwise moving irregularly. The deep hole 23 can therefore be formed with high positional accuracy. Finally, as shown in FIG. 11C, the grindstone 19 with the free abrasive grain finishes the wall of the hole 23 so as to complete the hole 4. The grindstone 19 suffers from a minimum of wear because the amount of grinding is small. The hole 23 to turn out the hole 4 has a sum of dimensional and positional errors which is less than 1 μm.

Hereinafter will be described examples of the present invention including specific conditions.

EXAMPLE 1

A base plate 1 was prepared by forming a $SiO_2$ film on a 1.0 mm thick Si substrate and then patterning it by photolithography. The base plate 1 was diced to form a 30 mm long, 1.9 mm wide strip. The diced base plate 1 was affixed by adhesive to the connecting member 2 shown in FIG. 3. The connecting member 2 was formed of ceramics and provided with the projections 10 beforehand. The end 3 of the connecting member 2 and base plate 1 were worked to be flush with each other. Then, the holes 4 were formed in the ends 3 of the connecting member 3 while being positioned with respect to the ends of the waveguide of the base plate 1. In this example, the waveguide of the base plate 1 had two cores spaced 250 μm from each other. Two holes 4 were formed in each end 3 in line with the end of the waveguide, and each was spaced 2.3 mm from the center between the two cores. The holes 4 each had a diameter of 0.7 mm and a depth of 3 mm. To form the holes 4, the grindstones 19 and 20 were operated in the manner described in relation to the seventh embodiment. The grindstone 22 had a diameter of 0.65 mm and diamond grain having a mesh size of 400 affixed thereto by metal. The grindstone 19 had a diameter of 0.70 mm and diamond grain having a mesh size of 2,000 also affixed thereto by metal.

As shown in FIGS. 10 and 11A–11C, the grindstone 19 with the fine abrasive grain was chucked by the air spindle 26. The grindstone 19 formed the 0.2 mm thick shallow recess 21 in the end 3 of the connecting member 2 with its tip 20 while the grinding liquid 28 was supplied to the grinding position. Then, the stage 27 was moved to locate the connecting member 2 just below the grindstone 22 chucked by the supersonic wave spindle 25. In this condition, the grindstone 22 deepened the shallow hole 21 to form a 3 mm deep hole 23 under the supply of the liquid 28. Subsequently, the stage 27 was again moved to locate the hole 23 just below the grindstone 19. At this time, the grindstone 19 finished the wall of the hole 23 to a diameter of 0.7 mm under the supply of the liquid 28 and thereby completed the hole 4 This was effected on each end of the base plate 1. The guide pins 6 were formed of stainless steel, and each had a diameter of 0.7 mm and a length of 11 mm. As shown in FIG. 2, the guide pins 6 were inserted into the holes 11 of the connector 5 and the holes 4 of the waveguide device 1, and then the clamp spring 8 was fitted on the connector 5 and connecting member 2 in the previously described manner. As a result, the two-core base plate 1 of the device 30 and the two-core connectors 5 were connected together.

The above connecting portion showed an initial excess loss of less than 2 dB and a mean excess loss of 0.8 dB. After 100 times of repeated connection and disconnection, the mean excess loss was found to be 0.9 dB.

EXAMPLE 2

As in Example 1, the base plate 1 with the two-core waveguide ends was adhered to the connecting member 2, and then two holes 4 were formed in each end of the connecting member 2. Two waveguide devices 30 each consisting of the base plate 1 and connecting member 2 were connected together by the guide pins 6, as shown in FIG. 4. The guide pins 6 were formed of stainless steel, and each had a diameter of 0.7 mm and a length of 5.8 mm. The two devices 30 were firmly retained by the clamp spring 8. The devices 30 were separable from each other because the guide pins 6 were removable from the holes 4. The connecting portion had an initial excess loss of less than 3 dB and a mean excess loss of 1.6 dB. After 100 times of repeated connection and disconnection, the mean excess loss was measured to be 1.9 dB.

EXAMPLE 3

The base plate 1 prepared in Example 1 was used. As shown in FIG. 5, the connecting member 2 formed of ceramics formed with the recesses 12 at the intermediate portions of the projections 10. The base plate 1 was adhered to the connecting member 2. The recesses 12 were each spaced 3 mm from the end 3. Each end 3 was smoothed by polishing, and then 3 mm deep holes 4 were formed in each end 3. When the hole 23, FIGS. 11B and 11C, was formed by the grindstone 22 having a diameter of 0.5 mm and rough abrasive grain, it turned out a through hole due to the effect of the recess 12. When the hole 23 was finished by the grindstone 19 having a diameter of 0.7 mm and fine abrasive grain, the grinding liquid was fed even from the outlet of the hole 23 so as to discharge the waste efficiently. The life of the grindstone 19 was 1.5 times as long as the life available with Example 1.

The dust ascribable to the repeated attachment and detachment was easily discharged to the outside of the holes 4. This reduced unexpected excess losses ascribable to the dust tending to enter the interface between the ends 3 of the base plates 1 or between the end 3 of the base plate 1 and the front end 33 of the connector 5. When the waveguide devices 30 were connected by the connecting member 2, the connecting portion showed an initial excess loss of 3 dB and a mean excess loss of 1.6 dB. After 100 times of repeated attachment and detachment, the mean excess loss was found to be 1.7 dB.

EXAMPLE 4

Each projection 10 of the connecting member 2 was formed with 0.1 mm wide slits 16 at a pitch of 0.7 mm. Then, the holes 4 were formed in the connecting member 2. Both when the deep hole 23 was formed by the grindstone 22 with the rough abrasive grain and when the hole 23 was finish by the grindstone 19 with the fine abrasive grain, the grinding liquid was fed via the slits 16 while the waste was efficiently driven out. As a result, not only the grindstone 19 but also the grindstone 22 achieved a life 1.5 times as long as the life available with Example 1. Further, the influence of dust ascribable to friction was reduced. When the connecting member 2 was used to connect two waveguide devices 1, the connecting portion showed an initial excess loss of 3 dB and a mean excess loss of 1.6 dB. After 100 times of repeated connection and disconnection, the mean excess loss was measured to be 1.7 dB.

EXAMPLE 5

As shown in FIGS. 7A and 7B, the grindstone 22 with the rough abrasive grain formed the deep hole 23 and then formed the arcuate pockets 18 by being shifted 0.1 mm upward, downward, rightward, and leftward. Finally, the grindstone 19 with the fine abrasive grain finished the inside diameter portion 24. The pockets 18 promoted the penetration of the grinding liquid and the discharge of the waste at the time of finishing. Again, the life of the grindstone 19 was 1.5 times as long as the life available with Example 1. When the waveguide devices 30 each having the holes 4 were collected together, the pockets 18 reduced the influence of dust ascribable to repeated attachment and detachment. The connecting portion showed an initial excess loss of 3 dB and a mean excess loss of 1.6 dB. After 100 times of repeated connection and disconnection, the mean excess loss was found to be 1.7 dB.

In Examples 1 through 5, the connecting member 2 was implemented by porous ceramics of silicone carbonate (SiC). Experiments showed that the porous ceramics improve the corrosion resistance of the connecting member 2 and provide the member 2 with 1.5 times higher durability against wear, compared to, e.g., resin or metal. As to the formation of the holes 4, the porous ceramics doubled the life of the grindstones 19 and 22, compared to fine sintered ceramics.

We conducted heat tests and cold-proof tests with the connecting member 2 formed of ceramics whose coefficient of thermal expansion was more than twice as great as the coefficient of thermal expansion of the Si base plate 1. For the heat tests, the temperature was elevated from room temperature to 70° C. while, for the cold-proof tests, the temperature was lowered from room temperature to −40° C. The tests showed that the breakage of the waveguide device 1 and other problems occur due to the difference in expansion and contraction. Specifically, when the base plate 1 was adhered to the connecting member 2 having a 2.5 times greater coefficient of thermal expansion and sharply heated from about 20° C. to 70° C., a tensile stress of about 2 kgf/mm$^2$ acted on the Si substrate. As a result, the waveguide device 1 started to break at cracks or chips brought about by dicing. In light of this, the connecting member 2 was formed of porous ceramics whose coefficient of thermal expansion was less than twice the coefficient of thermal expansion of the Si substrate.

EXAMPLE 6

As in Example 1, the silicon base plate 1 was adhered to the connecting member 3, and then the ends 3 of the assembly was polished. 3 mm deep holes 4 were formed in the opposite ends of the waveguide. Subsequently, the filler 15 implemented by thermosetting resin was applied to the walls of the holes 4. The master pins 17 were formed of Teflon and had a diameter of 0.7 mm each. The master pins 17 were respectively inserted into the holes 4, and then the connecting member 2 was heated to harden the filler 15. Thereafter, the master pins 17 were removed from the holes 4. Two waveguide devices 30 each having such a configuration were prepared. The guide pins 6 formed of stainless steel were inserted into the holes 4 of the two waveguide devices 30, and then the clamp ring 8 was fitted in the previously stated manner. In this example, the initial excess loss was less than 3 dB while the mean excess loss was 1.6 dB. There was reduced dust ascribable to repeated attachment and detachment and the unexpected excess loss ascribable to the dust. After 100 times of repeated attachment and detachment of the devices 1, the mean excess loss was found to be 1.7 dB. Furthermore, because the contact area between the guide pins 6 and the walls of the holes 4 was increased, the connection loss was reduced to less than ⅔, compared to the case wherein the filler 15 was not used. This was confirmed by exerting tension and shearing force on the connecting portion between the devices 30.

In Examples described above, the base plate 1 was implemented by a silicon waveguide or substrate having two-core ends while the holes having a diameter of 0.7 mm each were formed in each end 3 of the connecting member 2 at a pitch of 2.3×2=4.6 mm. Results comparable with the results of Examples above were achieved even when the waveguide had four-core ends, when the base plate was formed of lithium niobate or when the holes 4 each had a diameter different from 0.7 mm or 4.6 mm.

In summary, it will be seen that the present invention provides a structure allowing an optical waveguide device having a base plate connected to a connecting member to be removably connected not only to an optical connector but also to another optical waveguide device having an identical configuration without resorting to optical axis adjustment. The connection is therefore easy and highly reproducible.

Various modifications will become apparent to those skilled in the art after receiving the teachings of the present disclosure without departing from the scope thereof. For example, the projections 10 shown in FIG. 3 and used to anchor the clamp spring 8 may be replaced with, e.g., recesses or holes, so long as the entire connecting member 2 has a width and a thickness great enough to form the holes 4. Also, the clamp spring shown in FIG. 2 may be implemented as two loop-like resilient members.

The spindle motor 25 shown in FIGS. 11A–11C and using an ultrasonic wave may be replaced with any other high output motor. Likewise, the air spindle motor 26 may be replaced with any other high precision motor.

For the connecting member 2, use may be made of alumina, zirconia or similar ceramics in place of the sintered ceramics of silicon carbonate. Of course, the optical connector having a plurality core lines is only illustrative and may be replaced with a connector having a single core line.

What is claimed is:

1. In a structure for connecting a first and a second optical waveguide device by positioning end to end a first end of said first waveguide device, having a first waveguide which does not extend beyond said first end, and a second end of said second waveguide device, having a second waveguide which does not extend beyond said second end, and retaining said first and second waveguide devices together by a removable clamp spring such that said first and second ends are pressed against each other, said first end is formed with at least two first holes while said second end is formed with at least two second holes aligned with said first holes, and guide pins are each inserted in respective holes of said first end and respective holes of said second end when said first and second ends face each other, whereby said first and second waveguides are aligned with each other.

2. A structure as claimed in claim 1, wherein said first waveguide device comprises a connecting member formed with said first holes, and a base plate affixed to said connecting member and including an input/output end of said first waveguide, and wherein said second waveguide device comprises an optical connector including an second holes and said input/output end of said second waveguide and to which a fiber optic cable is connected.

3. A structure as claimed claim 1, wherein said first waveguide device comprises a first connecting member formed with said first holes, and a first base plate affixed to said connecting member and including an input/output end of said first waveguide, and wherein said second waveguide device comprises a second connecting member including an second holes, and a second bass plate including said input/output ends of said second waveguide and affixed to said second connecting member.

4. An optical waveguide connection device comprising:
a connecting member formed with at least two holes in an end thereof for receiving removable fitted guide pins;
a base plate, affixed to said connecting member, having an optical waveguide which does not extend beyond said end of said connecting member;
anchor portions included in said connecting member for anchoring an end of a clamp spring;
a pair of removable guide pins; and
a clamp spring.

5. A device as claimed in claim 4, wherein said connecting member is formed of porous ceramics having a coefficient of thermal expansion less than twice a coefficient thermal expansion of said base plate.

6. A device as claimed in claim 5, wherein said porous ceramics comprises silicon carbonate.

7. An optical waveguide device comprising;.
a connecting member formed with at least two holes in an end thereof for receiving guide pins;
a base plate, affixed to said connecting member, having an optical waveguide which does not extend beyond said end of said connecting member; and
anchor portions included in said connecting member for anchoring an end of a clamp spring,
wherein said anchor portions comprise projections including said end of said connecting member, and wherein said guide pins are inserted into said at least two holes formed in said projections.

8. A device as claimed in claimed 7, wherein each of said at least two holes has a cross-section consisting of a circle having a diameter substantially similar to a diameter of said guide pins, and at least one pocket bulging out from said circle.

9. A device as claimed in claim 7, wherein said projections are each formed with a plurality of slits extending of said at least two holes.

10. A device as claimed in claim 7, wherein said projection each include a recess, and wherein said at least two hole each extend from said end of said connecting through member to said recess.

11. A method of fabricating a connecting member of an optical waveguide device with at least two holes in an end thereof for receiving removably fitted guide pins comprising the steps of: (a) forming said at least two holes on an end of said connecting member;

(b) applying a filler to walls of said at least two holes, and inserting, while said filler is softened, master pins each being slightly greater in diameter than said guide pins into said at least two holes; and (c) hardening said filler, and removing said master pins from said at least two holes.

12. A method as claimed in claim 11, wherein step (a) comprises (d) roughly forming holes in said connecting member by a grindstone with a rough abrasive grain, and (c) finishing walls of said holes by a grindstone with a fine abrasive grain.

13. A method as claimed in claim 11, wherein step (a) comprises (d) forming a shallow tapered recess in an end of said connecting member by a grindstone with a fine abrasive grain, and (e) deepening said shallow tapered recess by said grindstone with said fine abrasive grain to thereby form a deep hole, and (f) finishing a wall of said deep hole by said grindstone with said fine abrasive grain.

14. The method of claim 11, further comprising forming a projection on said end of said connecting member and forming said at least two holes in said projection.

15. The method of claim 14, further comprising forming a recess on said projection and forming said at least two holes such that each of said holes extends through said projection to said recess.

16. The method of claim 14, further comprising forming a plurality of slits on said projection such that said slits extend through cross-sectional diameter areas of said at least two holes.

17. A method of fabricating an optical waveguide device comprising a connecting member formed with at least two holes in an end thereof for receiving guide pins; a base plate, affixed to said connecting member, having an optical waveguide which does not extend beyond said end of said connecting member; and anchor portions included in said connecting member for anchoring an end of a clamp spring, comprising the steps of:

(a) forming said at least two holes on an end of said connecting member;

(b) applying a filler to walls of said at least two holes, and inserting, while said filler is softened, master pins each being slightly greater in diameter than said guide pins into said at least two holes;

(c) hardening said filler, and removing said master pins from said at least two holes;

(d) forming a projection on said end of said connecting member; and (e) forming said at least two holes in said projection.

* * * * *